M. K. CODDING.
PROCESS FOR EXTRACTING MERCURY.
APPLICATION FILED JAN. 15, 1918. RENEWED JUNE 11, 1921.
1,402,742.
Patented Jan. 10, 1922.
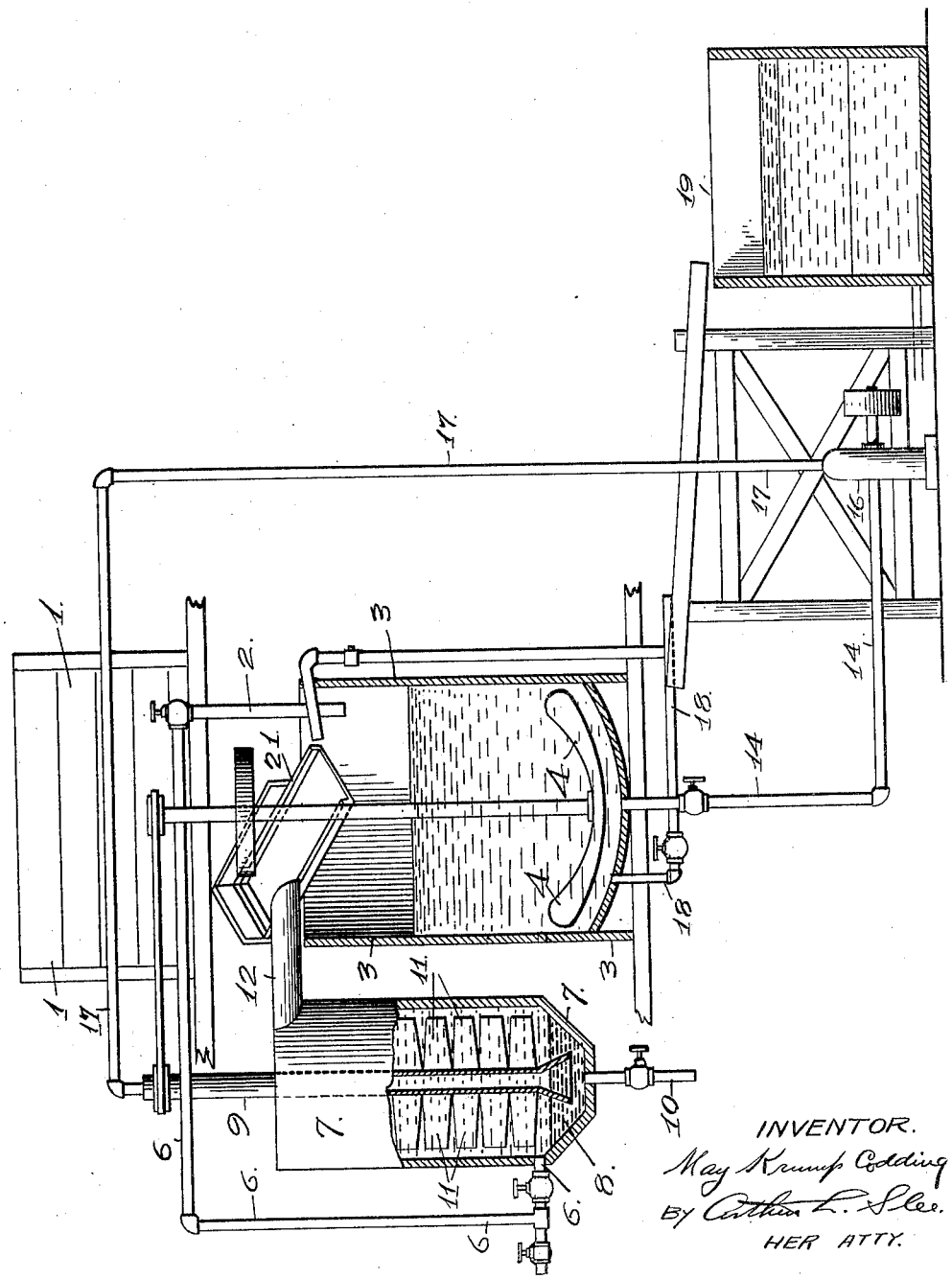
INVENTOR.
May Krump Codding
By Arthur L. Slee.
HER ATTY.

UNITED STATES PATENT OFFICE.

MAY KRUMP CODDING, OF SAN FRANCISCO, CALIFORNIA.

PROCESS FOR EXTRACTING MERCURY.

1,402,742.   Specification of Letters Patent.   Patented Jan. 10, 1922.

Application filed January 15, 1918, Serial No. 214,434. Renewed June 11, 1921. Serial No. 476,965.

*To all whom it may concern:*

Be it known that I, MAY KRUMP CODDING, a citizen of the United States, residing in the city and county of San Francisco and State of California, have invented a new and useful Improvement in Processes of Extracting Mercury, of which the following is a specification.

This invention relates to improvements in processes of extracting mercury; and it comprises a process of reducing and extracting mercury from sulfid ores containing mercuric sulfid, or cinnabar, wherein such an ore is disintegrated and agitated or pulped with certain saline solutions, best in the presence of a body of preformed mercury to act as a collecting agent, to cause a separation of mercury or quicksilver in the metallic state from the pulp of ore and gangue; all as more fully hereinafter set forth and as claimed.

The present practice in recovering mercury as metal from ores containing the same in sulfid and other forms consists in heating the ore to be treated in suitable retorts by furnace heat, whereby the mercury is vaporized; the vapors being subsequently condensed.

It is an object of the present invention to provide a process for the recovery of mercury in the metallic state from such ores without the necessity for the use of high temperatures, thereby not only securing a reduction in the cost of operation by the elimination of fuel but obviating the usual production of noxious and poisonous gases and vapors. In such method I also obviate the destruction of other metallic values which may reside within the ore being treated while, on the other hand, many of these values (such as the precious metals) may be recovered in the present process incidentally with the recovery of mercury.

I have found that by vigorously agitating ores containing mercury with certain saline matters in solution, the result is the production of metallic mercury. The mercury produced is of course in very finely divided form and for this reason I find it best to perform the agitation in the presence of a body of preformed mercury to act as a collecting agent. The newly produced mercury of course acts to replenish this body and withdrawal is made from time to time as mercury accumulates. In so recovering metallic mercury in the presence of a bath of metallic mercury all metals contained in the ore which are amenable to extraction by metallic mercury are also, of course, recovered. Other metals so recovered may be separated from the mercury in the usual ways.

While other saline solutions may be employed, I have found particularly applicable for the present purposes, a bath containing sodium nitrate, or what is commercially known as Chile saltpeter. With the sodium nitrate I customarily employ more or less sodium carbonate or sal soda. An addition of a small amount of potassium carbonate (salts of tartar) and of alum is also useful. A desirable bath is afforded by dissolving 100 parts of sodium nitrate, 37.5 parts of sodium carbonate and 2 parts of potassium carbonate (salts of tartar) in water. A very small addition of alum, say in the proportion of 2 ounces of alum for each 100 pounds of sodium nitrate, is desirable. In another and copending application, Serial No. 204,794, filed November 27, 1917, I have described and claimed a bath of this character. I find this particular bath highly useful for the present purposes but of course other baths may be used, although, in most cases, with less advantage.

In the use of this bath with the ore, the ore in a finely disintegrated form is simply agitated with the solution. After agitation has gone on for a sufficient length of time, residual or waste ores may be separated from the bath which may then be reused with fresh pulped ore. The residue so separated may, in many cases, be used as pigment. As it is desirable to reduce the ore to as fine a state of comminution as possible, this residue upon washing and drying is a fine uniformly colored material which may be used with various paint vehicles as a pigment. In the operation, the agitation should be thorough and sufficient to expose all portions of the material to the action of the solution, sufficient time being afforded for whatever reactions take place. In this connection I may note however that the actions seem to be fairly rapid. With excessive agitation, however, there is some danger of flouring and floating off mercury in the bath.

In the accompanying illustration I have shown, more or less diagrammatically, a desirable type of apparatus for use in the performance of the present process. In this showing the figure is a view in vertical section, certain parts being shown in elevation. In the showing Element 1 is a solution tank or vat of any suitable material, shown as a wooden tank. Leading from the tank is a valve controlled conduit 2 having a side connection (6). Through 2 liquid may be discharged into an agitating device 3, shown as an open tank provided with propeller means or other suitable stirring means 4. Motion is imparted by a suitable shaft and pulley. The side connection 6 from the solution tank leads to an amalgamator 7 provided with a mercury bath or sump 8 in the lower end. Within the amalgamator is a hollow rotating shaft 9, its lower end being coned and open and immersed or submerged in the mercury at the bottom. In order to maintain the desired level of mercury within the apparatus, valve controlled outlet 10 is provided for withdrawing mercury. On the rotating shaft are mounted vanes 11 which may be bent to such form as will give an efficient lifting action on liquids within the amalgamator. Near the top of the amalgamator is a spill-way 12 through which any overflow of solution and pulp may flow back to the main agitating tank 3. The agitating tank is provided on its bottom with a drain or connection 14 leading to pump 16. From the pump 16 pipe connection 17 leads upward and discharges into the hollow shaft in the amalgamating device. By use of this circulating system, pulp of ore and solution may be withdrawn from the bottom of the agitator and discharged into the amalgamator, passing through the mercury bath. The agitating device is also provided with another drain connection 18, suitably valved and leading to a settling tank 19. In designing the vanes of the hollow rotating shaft in the amalgamator, they should be so arranged as to agitate, lift and thoroughly mix the solution and ore pulp without material disturbance and flouring of the mercury bath within the sump.

In the use of the apparatus just described, the mercury ore to be treated is first comminuted and reduced to a pulp. It may be at the ordinary temperature. The tank 3 is filled with a solution or bath, which may be, and advantageously is, the specific solution hereinbefore described. This solution is sent from tank 1 through connection 2. In the agitator the comminuted ore is thoroughly mixed with the solution. Blades 4 as shown have an agitating and lifting action, providing an upward circulation at the center of the tank and downwards along the sides. After agitation has been sufficiently long continued to expose all portions of the ore to the action of the chemicals, a mixture of ore and solution is delivered by pipe 14 to pump 16, whence it passes downward through the interior of a hollow shaft 9 in the amalgamator. The pump passes the mixture positively through the mercury bath. I ordinarily submerge the end of the hollow shaft in the mercury some distance. In passing through the mercury, heavier particles of separated mercury tend to remain in the bath. Agitation is continued in the amalgamator until the action has gone to the extent desired. The mercury produced is withdrawn from time to time through 10, sufficient being always left to form the mercury bath 8. The withdrawal of pulped ore and solution from 3 and 14 and 17 and discharge through the amalgamator may be continued for as long a time as desired, there being an overflow of lighter ore and solution back over the spillway 12 to the agitation tank 3. In so operating, there is a continuous circulation of the ore and solution for as long a time as may be deemed necessary, lighter demetallized ore passing upward to the spill-way and heavier particles of metal remaining in the bath 8. When the operation has gone forward to such an extent that further recovery of values is deemed unnecessary, the exhausted material is withdrawn through 18 and settled in 19 to recover the bath.

I sometimes find it desirable to interpose an ordinary amalgamating plate 21 between the spill-way and agitating tank 3.

What I claim is:—

1. The process of extracting mercury from sulfid ores which comprises agitating the comminuted ore with a saline solution of the character described in the absence of reducing metals and recovering metallic mercury separated thereby.

2. The process of extracting mercury from sulfid ores which comprises agitating the comminuted ore with a saline solution of the character described in the absence of reducing metals and recovering metallic mercury separated thereby with the aid of a body of preformed mercury, the mixture of ore and solution being circulated in contact with said body.

3. The process of extracting mercury from sulfid ores which comprises agitating the comminuted ore with a solution of sodium nitrate and recovering metallic mercury separated thereby.

4. In the extraction of mercury from sulfid ores, the process which comprises agitating finely comminuted ore with a saline solution of the character described in the absence of reducing metals to produce a suspension of ore and solution, passing the mixture through a body of mercury to recover produced metallic mercury, agitating the mixture and once more passing said mixture into contact with the mercury, the passage being repeated as often as may be deemed necessary for the extraction of values.

5. In the production of metallic mercury from sulfid ores, the process which comprises comminuting the ore and agitating it in the presence of a bath comprising water and dissolved sodium nitrate, sodium carbonate and potassium carbonate, there being also present a little dissolved alum.

6. In the production of metallic mercury from sulfid ores, the process which comprises comminuting the ore and agitating it in the presence of a bath comprising water and dissolved sodium nitrate, sodium carbonate and potassium carbonate, there being also present a little dissolved alum, the agitated mixture being repeatedly brought into contact with a bath of metallic mercury.

7. The process of extracting mercury from sulfid ores which comprises agitating the comminuted ore with a solution of a nitrate and recovering metallic mercury separated thereby.

In witness whereof I hereunto set my signature.

MAY KRUMP CODDING.